United States Patent
Sun et al.

(10) Patent No.: US 12,443,153 B2
(45) Date of Patent: Oct. 14, 2025

(54) DEEP LEARNING MODEL IN HIGH-MIX SEMICONDUCTOR MANUFACTURING

(71) Applicant: Onto Innovation Inc., Wilmington, MA (US)

(72) Inventors: Yulei Sun, Flower Mound, TX (US); Shelby Crain, Sachse, TX (US); Stephen McWilliams, Carrollton, TX (US)

(73) Assignee: Onto Innovation Inc., Wilmington, MA (US)

( * ) Notice: Subject to any disclaimer, the term of this patent is extended or adjusted under 35 U.S.C. 154(b) by 378 days.

(21) Appl. No.: 17/934,912

(22) Filed: Sep. 23, 2022

(65) Prior Publication Data

US 2023/0102925 A1 Mar. 30, 2023

Related U.S. Application Data (60) Provisional application No. 63/247,904, filed on Sep. 24, 2021.

(51) Int. Cl.
G05B 13/02 (2006.01)

(52) U.S. Cl.
CPC .................. *G05B 13/027* (2013.01)

(58) Field of Classification Search
CPC .................................... G05B 13/027
USPC .......................................................... 700/48
See application file for complete search history.

(56) References Cited

U.S. PATENT DOCUMENTS

| | | | |
|---|---|---|---|
| 8,639,365 B2 * | 1/2014 | Pannese | G06F 30/20 706/14 |
| 2008/0208372 A1 * | 8/2008 | Pannese | G05B 13/027 700/121 |
| 2017/0109646 A1 * | 4/2017 | David | G03F 7/70625 |
| 2019/0277913 A1 * | 9/2019 | Honda | G01R 31/2894 |
| 2019/0304849 A1 | 10/2019 | Cheong et al. | |
| 2020/0379454 A1 | 12/2020 | Trinh et al. | |
| 2021/0012239 A1 | 1/2021 | Arzani et al. | |
| 2022/0308566 A1 * | 9/2022 | Meyer | G05B 13/048 |
| 2022/0390856 A1 * | 12/2022 | Asano | G03F 7/70516 |
| 2023/0106601 A1 * | 4/2023 | Itoh | G05B 19/4184 700/48 |

(Continued)

FOREIGN PATENT DOCUMENTS

| | | |
|---|---|---|
| CN | 111902924 | 11/2020 |
| CN | 115859764 | 3/2023 |
| JP | 2020123675 | 8/2020 |

(Continued)

OTHER PUBLICATIONS

"Japanese Application Serial No. 2022-152520, Notification of Reasons for Refusal mailed Nov. 6, 2023", with English translation, 7 pages.

(Continued)

*Primary Examiner* — Md Azad (74) *Attorney, Agent, or Firm* — Schwegman Lundberg & Woessner, P.A.

(57) ABSTRACT

Disclosed techniques for applying a neural network deep learning model in a fabrication strategy for high-mix semiconductor manufacturing, such as deposition, chemical-mechanical polishing (CMP), etching, photolithography, plating, etc. Training and normal operation modes of the fabrication strategy are described.

20 Claims, 8 Drawing Sheets

(56) References Cited

U.S. PATENT DOCUMENTS

2023/0176548 A1* 6/2023 Kusayanagi ......... G05B 13/027 700/28

FOREIGN PATENT DOCUMENTS

| | | |
|---|---|---|
| JP | 2021047001 | 3/2021 |
| JP | 2023055660 | 4/2023 |
| WO | 2020105517 | 5/2020 |

OTHER PUBLICATIONS

"Japanese Application Serial No. 2022-152520, Response filed May 2, 2024 to Notification of Reasons for Refusal mailed Nov. 6, 2023", with English claims, 10 pages.

"Japanese Application Serial No. 2022-152520, Notification of Reasons for Rejection mailed Aug. 5, 2024", with English translation, 7 pages.

"Japanese Application Serial No. 2022-152520, Response filed Feb. 5, 2025 to Notification of Reasons for Rejection mailed Aug. 5, 2024", with English claims, 10 pages.

"Japanese Application Serial No. 2022-152520, Decision of Rejection mailed Apr. 28, 2025", with English translation, 7 pages.

Bachiraju, P., "Fab fingerprint for proactive yleld management", 2021 32nd Annual SEMI Advanced Semiconductor Manufacturing Conference (ASMC), (2021), 4 pgs.

Chen, I., "A study of neural networks for the evolution of run-to-run control", Advanced Process Control Smart Manufacturing Conference, (Oct. 2020), 25 pages.

Chen, I., "Run-to-run control modeling with recurrent neural networks", APC Conference XXXI, San Antonio, TX, (2019), 33 pages.

Hao, Y., "Artificial intelligence and machine learning in semiconductor manufacturing: inspection and metrology", Semiconductor Digest, (Jun. 2020), 16-21.

Redman, J., "Machine learning deep learning advanced analytics artificial intelligence for semiconductor manufacturing", APC Conference XXXI San Antonio TX, (Oct. 2018), 102 pages.

Sun, Y., "Empower R2R Controller Design and Implementation with Data Analytics", Advanced Process Control Smart Manufacturing Conference, (Oct. 7, 2020), 5 pgs.

Wong, F., "Methods to overcome limited labeled data sets in machine learning-based optical critical dimension metrology", Proc. of SPIE, vol. 11611, (2021), 8 pgs.

"Chinese Application Serial No. 202211176999.6, Office Action mailed Jun. 18, 2025", with English translation, 27 pages.

"Japanese Application Serial No. 2022-152520, Response filed Aug. 28, 2025 to Decision of Rejection mailed Apr. 28, 2025", with English claims, 18 pages.

* cited by examiner

Table 502:

| | MACHINE | LAYER | PRODUCT | OBSERVEDDEPRATE |
|---|---|---|---|---|
| 0 | CVD-01 | 1 | 3059 | 0.685098 |
| 1 | CVD-01 | 1 | 3059 | 0.690010 |
| 2 | CVD-01 | 1 | 3059 | 0.683857 |
| 3 | CVD-01 | 1 | 3061 | 0.695134 |
| 4 | CVD-01 | 1 | 3061 | 0.696837 |
| ... | ... | ... | ... | ... |
| 2995 | CVD-01 | 4 | 3059 | 0.598119 |
| 2996 | CVD-02 | 3 | 3061 | 0.648666 |
| 2997 | CVD-01 | 3 | 3059 | 0.687119 |
| 2998 | CVD-01 | 3 | 3059 | 0.686212 |
| 2999 | CVD-02 | 3 | 3131 | 0.655170 |

Table 504:

| | 0 | 1 | 2 | 3 | 4 | 5 | 6 | 7 | 8 | 9 | ... | 11 | 12 | 13 | 14 | 15 | 16 | 17 | 18 | 19 | OBSERVEDDEPRATE |
|---|---|---|---|---|---|---|---|---|---|---|---|---|---|---|---|---|---|---|---|---|---|
| 0 | 1.0 | 0.0 | 1.0 | 0.0 | 0.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.685098 |
| 1 | 1.0 | 0.0 | 1.0 | 0.0 | 0.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.690010 |
| 2 | 1.0 | 0.0 | 1.0 | 0.0 | 0.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.683857 |
| 3 | 1.0 | 0.0 | 1.0 | 0.0 | 0.0 | 0.0 | 0.0 | 0.0 | 0.0 | 0.0 | ... | 1.0 | 0.0 | 0.0 | 0.0 | 0.0 | 0.0 | 0.0 | 0.0 | 0.0 | 0.695134 |
| 4 | 1.0 | 0.0 | 1.0 | 0.0 | 0.0 | 0.0 | 0.0 | 0.0 | 0.0 | 0.0 | ... | 1.0 | 0.0 | 0.0 | 0.0 | 0.0 | 0.0 | 0.0 | 0.0 | 0.0 | 0.696837 |
| ... | ... | ... | ... | ... | ... | ... | ... | ... | ... | ... | ... | ... | ... | ... | ... | ... | ... | ... | ... | ... | ... |
| 2995 | 1.0 | 0.0 | 0.0 | 0.0 | 1.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.598119 |
| 2996 | 0.0 | 1.0 | 0.0 | 1.0 | 0.0 | 0.0 | 0.0 | 0.0 | 0.0 | 0.0 | ... | 1.0 | 0.0 | 0.0 | 0.0 | 0.0 | 0.0 | 0.0 | 0.0 | 0.0 | 0.648666 |
| 2997 | 1.0 | 0.0 | 0.0 | 1.0 | 0.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.687119 |
| 2998 | 1.0 | 0.0 | 0.0 | 1.0 | 0.0 | 0.0 | 0.0 | 0.0 | 0.0 | 1.0 | ... | 0.0 | 0.0 | 0.0 | 0.0 | 0.0 | 0.0 | 0.0 | 0.0 | 0.0 | 0.686212 |
| 2999 | 0.0 | 1.0 | 0.0 | 1.0 | 0.0 | 0.0 | 0.0 | 0.0 | 0.0 | 0.0 | ... | 0.0 | 0.0 | 0.0 | 0.0 | 0.0 | 0.0 | 0.0 | 1.0 | 0.0 | 0.655170 |

DEEP LEARNING MODEL IN HIGH-MIX SEMICONDUCTOR MANUFACTURING

CROSS-REFERENCE TO RELATED APPLICATION

This application claims the benefit of priority to U.S. Provisional Patent Application Ser. No. 63/247,904 filed Sep. 24, 2021, the contents of which are incorporated herein by reference in its entirety.

TECHNICAL FIELD

The present disclosure generally relates to applying a deep learning network, such as a recurrent neural network (RNN) deep learning model, in a fabrication strategy for high-mix semiconductor manufacturing, such as deposition, chemical-mechanical polishing (CMP), etching, photolithography, plating, etc.

BACKGROUND

Semiconductor manufacturing typically utilizes linear process models for processing parameters such as calculating deposition time. For example, a linear process model of layer thickness versus process time can be used to calculate process time. However, the linear process model can be limiting in terms of its applications and uses.

In the past ten years, primarily driven by a tremendous expansion in the availability of data and computing power, artificial intelligence (AI) and machine learning (ML) technologies have found their way into many different areas and disruptively changed our life and way of solving problems. For example, these technologies can refine results in online search and shopping, customize advertising, tailor news feeds, and even drive cars. Recently, the ability of AI/ML to learn from data autonomously and quickly find patterns and correlations has found its applications in metrology and inspection in the semiconductor manufacturing industry. However, adopting AI/ML technologies to semiconductor manufacturing has been difficult because building and deploying a deep learning model in semiconductor manufacturing environment is not a simple, straightforward process but involves complex steps, especially in a high-mix manufacturing environment.

SUMMARY

This disclosure describes techniques for applying a recurrent neural network (RNN) deep learning model in a fabrication strategy for high-mix semiconductor manufacturing, such as deposition, chemical-mechanical polishing (CMP), etching, photolithography, plating, etc.

This disclosure describes method to set at least one processing parameter for manufacturing a semiconductor device. The method comprises: receiving context information regarding the at least one processing parameter; inputting the context information into a machine learning network; receiving a predicted value for the at least one processing parameter from the machine learning network; setting the at least one processing parameter based on the predicted value to manufacture the semiconductor device; receiving a measured result of the semiconductor device associated with the at least one processing parameter; and feeding back the measured result into the machine learning network.

This disclosure also describes a control system including a at least one hardware processor. The control system also includes at least one memory storing instructions that, when executed by the at least one hardware processor, cause the at least one hardware processor to perform operations comprising: receiving context information regarding at least one processing parameter; inputting the context information into a machine learning network; receiving a predicted value for the at least one processing parameter from the machine learning network; setting the at least one processing parameter based on the predicted value to manufacture a semiconductor device; receiving a measured result of the semiconductor device associated with the at least one processing parameter; and feeding back the measured result into the machine learning network.

This disclosure further describes a machine-storage medium embodying instructions that, when executed by a machine, cause the machine to perform operations comprising: receiving context information regarding at least one processing parameter; inputting the context information into a machine learning network; receiving a predicted value for the at least one processing parameter from the machine learning network; setting the at least one processing parameter based on the predicted value to manufacture a semiconductor device; receiving a measured result of the semiconductor device associated with the at least one processing parameter; and feeding back the measured result into the machine learning network.

BRIEF DESCRIPTION OF THE DRAWINGS

Various ones of the appended drawings merely illustrate example implementations of the present disclosure and should not be considered as limiting its scope.

DETAILED DESCRIPTION

A recurrent neural network (RNN) deep learning model can be applied in a fabrication strategy for high-mix semiconductor manufacturing, such as deposition, chemical-mechanical polishing (CMP), etching, photolithography, plating, etc. The RNN model can be trained and then used in runtime in the fabrication strategy. Training and normal operation modes of the fabrication strategy are described.

First, the RNN model is configured and trained to calculate process parameters during a training mode. In the training mode, relevant test data may be collected. The collected data may include different features (or inputs of the model). In some examples, the features may be independent of each other. The collected data may include sufficient variabilities, based on the features, for model extraction. The collected data may be pre-processed. For example, string data may be converted to numerical data. Also, the collected data may be scaled so that features are evaluated by their proportions, not absolute values. Moreover, the hyperparameters of the model may be tuned.

Second, in normal operation (runtime) mode, the trained RNN model may be deployed in a manufacturing process to calculate and set processing parameters. Relevant data for each run may be collected. The data may be processed and filtered, and then fed back into the RNN model for updating. The updated RNN model may then predict processing parameters in the semiconductor manufacturing process with improved accuracy. Machine settings for different processes, e.g., deposition time, exposure dose, overlay settings, etc., may be calculated using the RNN model techniques described herein.

Figure 1:
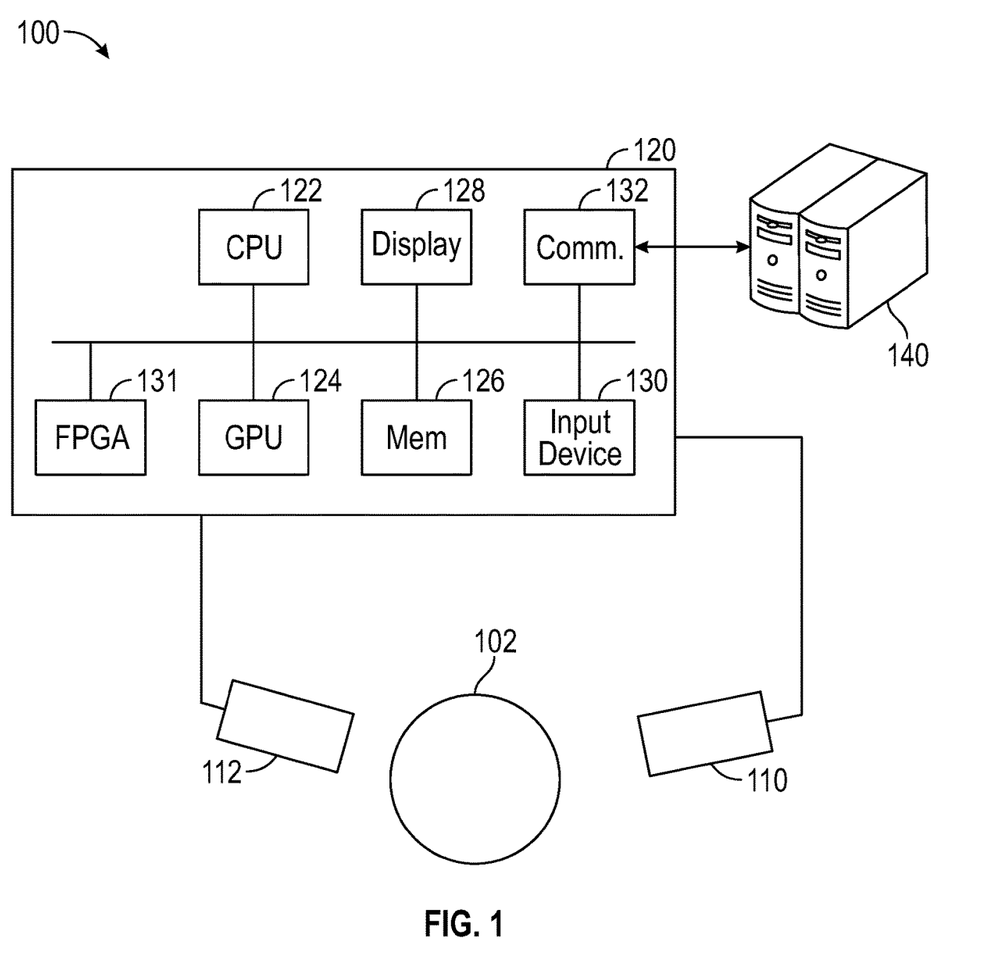
FIG. 1 illustrates example portions of a fabrication system, according to some examples of the present disclosure.

FIG. 1 illustrates example portions of a fabrication system 100, which can be used to perform one or more techniques showed and described herein. The fabrication system 100 can be used for manufacturing and inspecting a substrate 102, such as a semiconductor device.

The fabrication system 100 may include one or more tools 110 (also referred to as machines) to perform a processing step on the substrate 102 for fabrication. In some examples, the tool 110 may include a chemical vapor deposition (CVD) machine for depositing one or more layers on the substrate 102. In some examples, the tool 110 may include a polishing tool for performing CMP, an illumination source to emit a beam of radiation (e.g., electromagnetic waves) projecting onto the substrate 102 for photolithography, a plating tool for plating the substrate and/or other suitable tools for semiconductor fabrication.

The fabrication system 100 may include a metrology instrument 112 (also referred to as inspection instrument) to measure various features on or characteristics of the substrate 102. The various features and characteristics may comprise, for example, film thickness measurements, critical-dimensions (CD) measurements (in x-dimensions, y-dimensions, and/or z-dimensions) of features formed on a substrate, a pitch of line-space features formed on a substrate, an overlay offset from one layer to another on the substrate, or a number of other measurements or characteristics known to a person of ordinary skill in the art. The inspection instrument can be used to check for compliance of features formed on or otherwise found on a substrate. For example, the inspection can be of a substrate upon which integrated circuit dice have been fabricated, locations of the dice, locations of unwanted particulate matter or other unwanted or unplanned features, and so on.

The tool 110 and metrology instrument 112 may be coupled to a control system 120. The control system 120 may include a computer processing unit (CPU) 122, a graphic processing unit (GPU) 124, a field programmable gate array (FPGA) 131 (or other suitable accelerators such as a data processing unit (DPU), RNN, artificial neuron network (ANN) and the like), a memory 126, a display 128, an input device 130, and a communication interface 132 (e.g., high performance network (HPC)). The control system 120 can also include front-end circuitry such as transmit signal chains, receive signal chains, switch circuitry, digital and analog circuitry, etc. The transmit signal chain may provide control signals for the tool 110. The receive signal chain may receive process parameter measurements from the metrology instrument 112.

The front-end circuitry may be coupled to and controlled by one or more processor circuits, such as the CPU 122, GPU 124, and FPGA 131. The CPU 122 may be provided as one or more multi-core processors. The GPU 124 and FPGA 131 may be used to accelerate the processing of data and the performance of the machine learning network as described herein. The techniques shown and described herein can be executed by the CPU 122 working in conjunction with the GPU 124 for faster processing.

The CPU 122 and GPU 124 may be coupled to the memory 126, such as to execute instructions that cause the control system 120 to perform one or more of manufacturing control, processing, or storage of data relating to inspection, or to otherwise perform techniques as shown and described herein. The control system 120 can be communicatively coupled to other portions of the system 100, such as using a wired or wireless communication interface 132.

For example, performance of one or more techniques as shown and described herein can be accomplished on-board the control system 120 or using other processing or storage facilities such as using a compute facility 140 (e.g., a general-purpose computing device such as a server, cloud processing system, data warehouse, laptop, tablet, smartphone, desktop computer, or the like). For example, processing tasks that would be undesirably slow if performed on-board the control system 120 or beyond the capabilities of the control system 120 can be performed remotely (e.g., on a separate system), such as in response to a request from the control system 120. Similarly, storage of inspection data or intermediate data can be accomplished using remote facilities communicatively coupled to the control system 120. The control system 120 may also include the display 128, such as for presentation of configuration information or results, and the input device 130 such as including one or more of a keyboard, trackball, function keys or soft keys, mouse-interface, touch-screen, stylus, or the like, for receiving operator commands, configuration information, or responses to queries.

The control system 120 may utilize RNN models to predict and set processing parameters used by the tool 110. The RNN model may be provided via the compute facility 140 (e.g., cloud processing system). The processing results may be measured by the metrology instrument 112 to update the RNN model. The RNN model may be built using Run-to-Run (R2R) algorithms and software scripts. For example, a RNN model may be built offline in a computer programming script, such as Python, to predict processing parameters (e.g., deposition rate) to be used in the manufacturing process using historical production data. During runtime, the deposition control strategy (or other processing strategy) can invoke the RNN script to trigger model prediction which is then used to calculate the process time setting for each lot that will result in the desired target layer thickness value. The actual layer thickness of this lot can be later measured using metrology instrument 112 and fed back to the control system 120 to update the RNN model.

Figure 2:
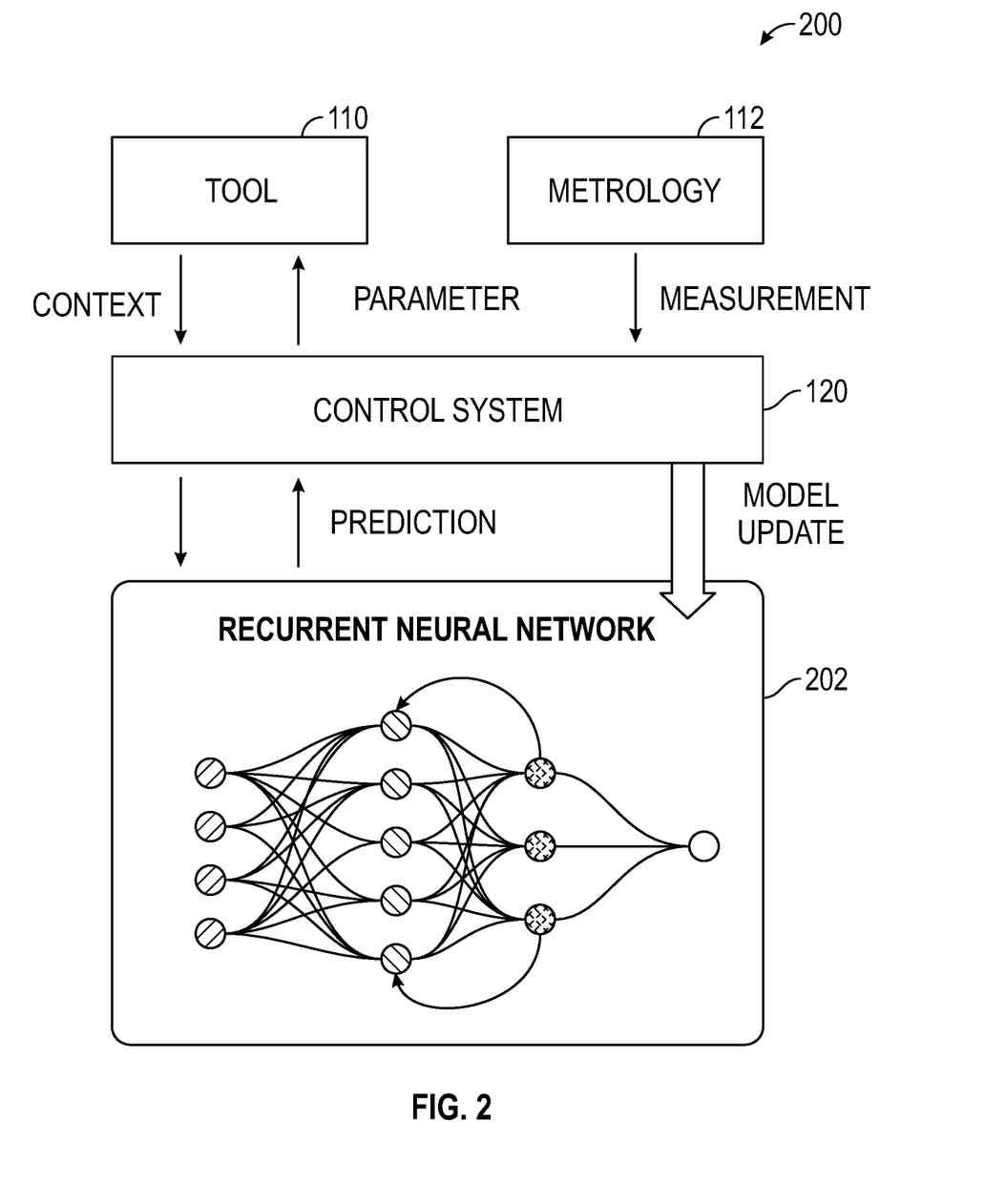
FIG. 2 shows a framework of a run-to-run strategy based on a RNN deep learning model, according to some examples of the present disclosure.

FIG. 2 shows a framework 200 of a R2R strategy based on a RNN deep learning model. The framework 200 may include tool 110, metrology instrument 112, control system 120, and a RNN model 202. During runtime, the tool 110 may provide context information to the control system 120 with respect to a processing step to be performed by the tool 110, such as deposition. The control system 120 may utilize the RNN model 202 to generate a process parameter prediction (e.g., deposition rate prediction), which is then used to operate the tool 110 to perform the processing step (e.g., deposition). The metrology instrument 112 may measure the result of the processing step (e.g., film thickness), which may then be used to update RNN model 202.

As described herein, building and deploying a deep learning model is not a simple, straightforward process but involves complex steps, especially in a high-mix manufacturing environment. Hence, subject matter expertise (SME) can be employed to build a solid and effective deep learning model that can be used for R2R control as described herein. This is because to build a working model, there should be correlation and meaning in the dataset that can be extracted, and enough features (or inputs to the model), preferably independent of each other, to be incorporated in the model. The features selection may include manufacturing context, equipment hardware parameters, consumable usages, and upstream parametric data, etc., that can impact the output values of the model (or labels). Manufacturing context may include the tool ID that was used to process a lot, the layer the lot is current at, and the final product ID (e.g., memory, CPU, etc.) because the same process may generate variabilities depending on the different combination of above manufacturing context. The equipment hardware parameters may include maintenance information (e.g., number of runs since last maintenance), machine/tool configurations such as current and voltage settings. Upstream parametric data may include data from the same lot after it has been processed upstream, such as thickness before the deposition, etch or polishing step.

Figure 3:
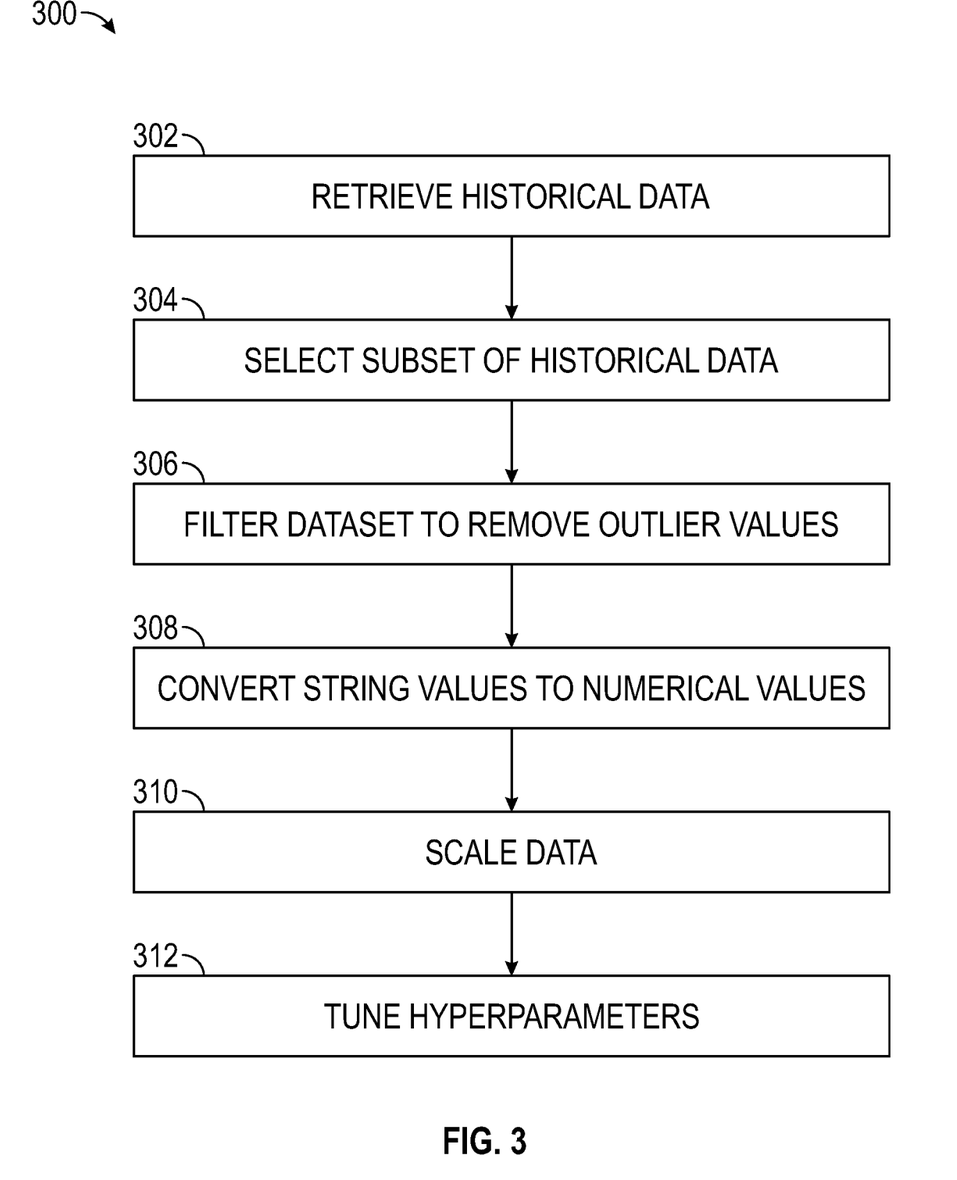
FIG. 3 a flow diagram of a method for training a RNN model, according to some examples of the present disclosure.

Initially, the RNN model is constructed and trained before it is deployed in use during runtime. FIG. 3 illustrates a flow diagram of a method 300 for training a RNN model. At operation 302, historical data may be retrieved. In some examples, the historical data may be provided by an equipment automation program. In some examples, the historical data may be stored in a database and is queried by a R2R system for retrieval. The database may be updated based on runtime operations, so the data may be retrieved before runtime operations for updating.

However, simply throwing data to deep learning algorithms, without proper feature selection, generally will not produce valuable results. A large dataset by itself does not assure a successful ML model. Instead, select data for relevant features that contains enough variabilities for the model to extract generates better results, as described herein.

At operation 304, a subset of the historical data may be selected. The selected data may be based on feature selection relevant to the process parameter associated with the RNN model. Subject matter expertise (SME) can be employed for pruning the large dataset to the select data to build a solid and effective deep learning model that can be used for R2R control. To build a reliable, accurate model, features with correlation and meaning in the dataset can be extracted. A minimum number of features (e.g., at least two) are extracted to be incorporated in the model as inputs to the model. The features can be independent of each other. For example, a route and a product can be considered non-independent. A route is a list of steps performed on a lot of products, and a route is typically dedicated to a product line. Hence, selecting route and product as features can provide duplicative context information for the model.

The features selection may include manufacturing context, equipment hardware parameters, consumable usages, and upstream parametric data, etc., that can impact the output values of the model. Manufacturing context may include the tool ID that was used to process a lot, the layer the lot is current at, and the final product ID (e.g., memory, CPU, etc.) because the same process may generate variabilities depending on the different combination of above manufacturing context. The equipment hardware parameters may include maintenance information (e.g., number of runs since last maintenance), machine/tool configurations such as current and voltage settings. Upstream parametric data may include data from the same lot after it has been processed upstream, such as thickness before the deposition, etch or polishing step.

Features selection may use data analytics for the selection. For example, linear or non-linear regression techniques can be used to identify the most relevant features for a specified processing parameter to be predicted by the RNN model. An analysis of variance (ANOVA) can be performed to estimate the variance of the processing parameter based on the various features. The features with a direct relationship to the variance can be identified and selected.

Figure 4:
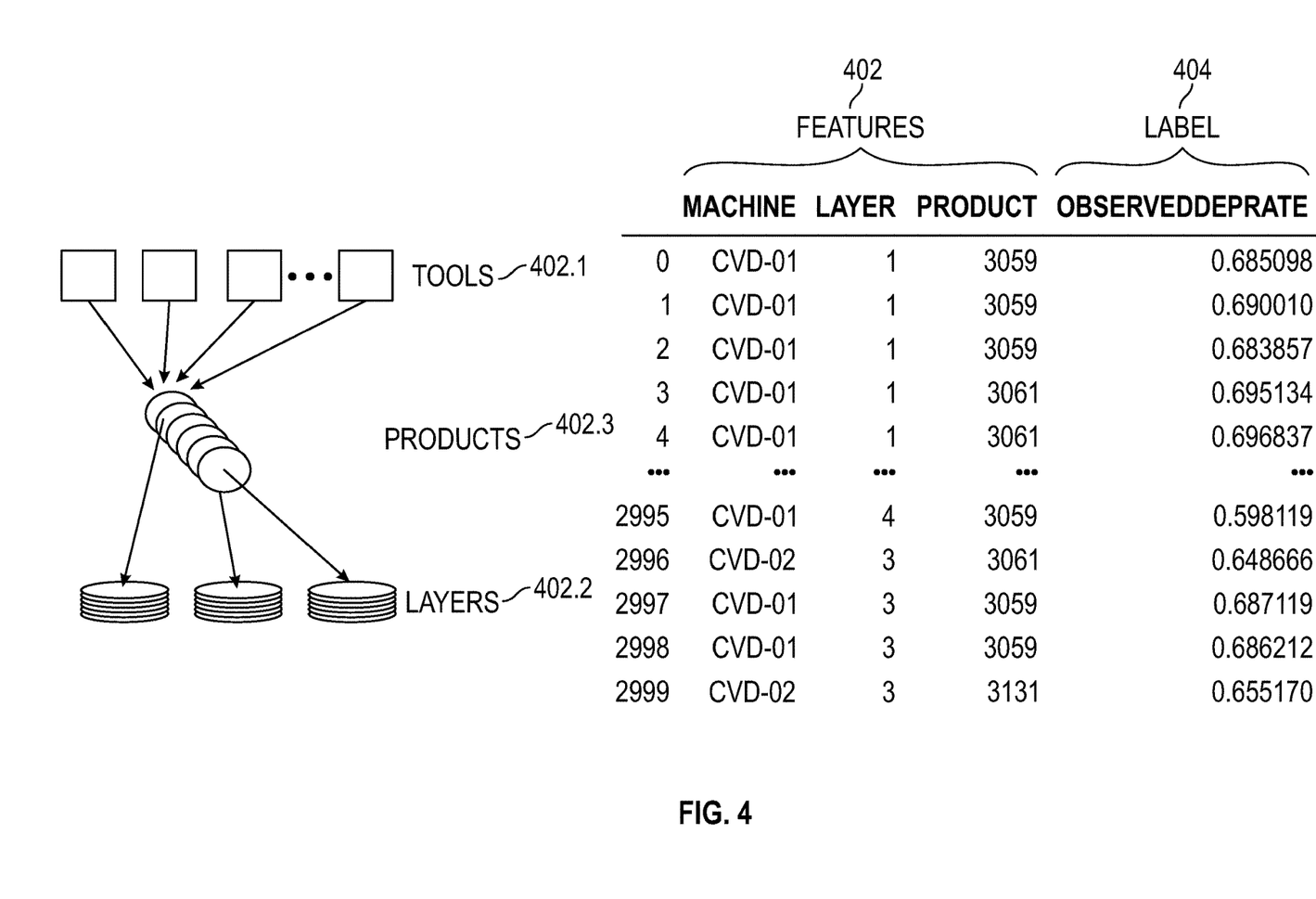
FIG. 4 illustrates an example of select features for a deposition rate model, according to some examples of the present disclosure.

FIG. 4 illustrates an example of select features for a deposition rate model. Here, the features 402 may include machine/tool 402.1, layer 402.2, and product 402.3. Also, the output (i.e., label 404) may also be included. Here, the observed deposition rate is included as part of select data for training the model. The observed deposition rate may have been measured by a metrology tool in previous runs.

Returning to FIG. 3, at operation 306, a filtering operation on the dataset can be performed. The filtering operation may remove outlier values in the dataset so that those outlier values do not adversely impact the model. The filtering operation may include a Tukey filter (also referred to as Tukey window), Grubb's filter, a basic limit filter, and/or other suitable filters.

Preprocessing may be performed on the dataset. The selected data may be pre-processed before it is used by the RNN model. For example, in a high-mix manufacturing environment (e.g., foundries), the same process can be executed on multiple tools to build different products with multiple layers; each different combination of these context attributes, e.g., machine, product, layers, etc., can make the same process to produce different results from others.

Figure 5:
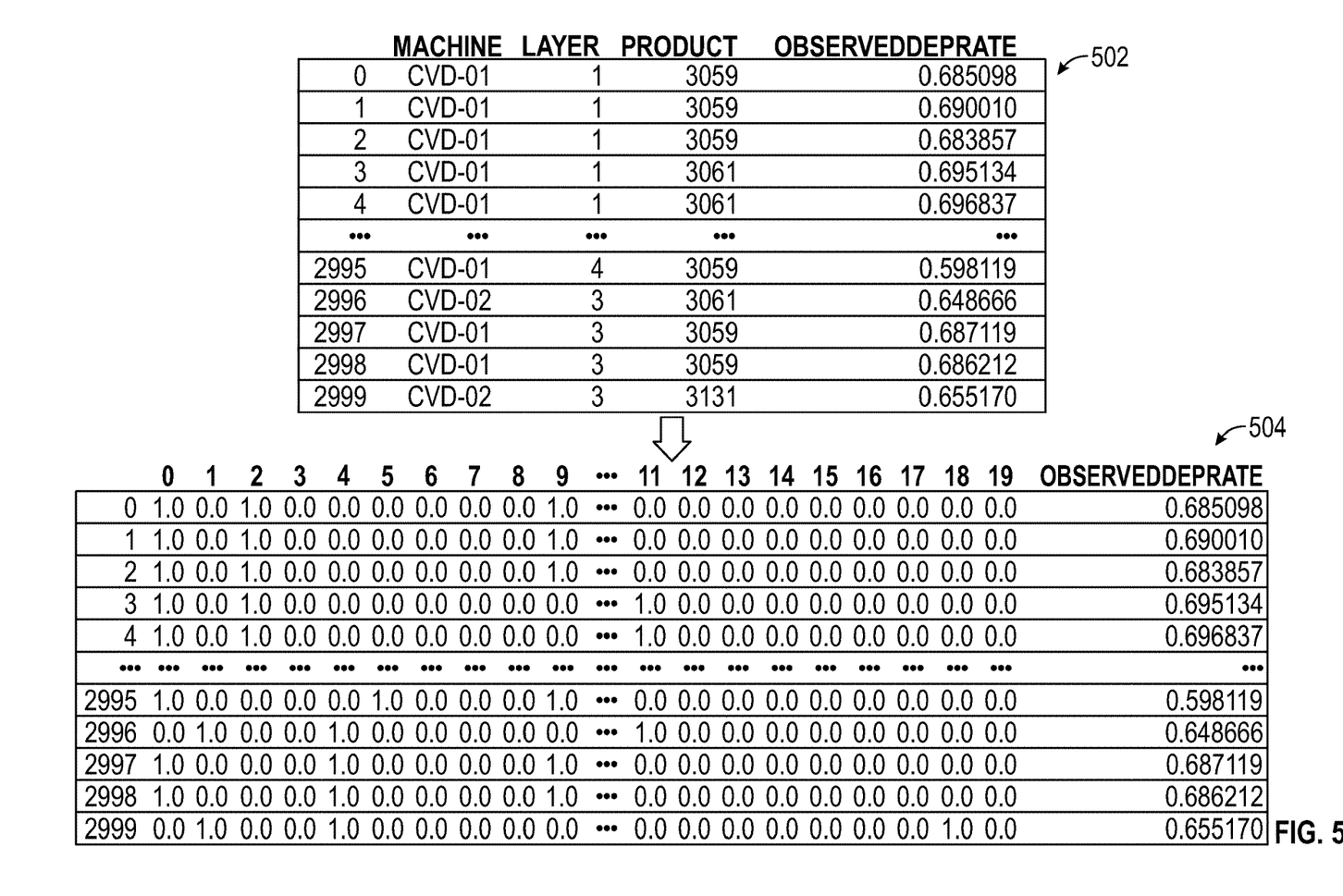
FIG. 5 illustrates an example of one-hot encoding of converting string data, according to some examples of the present disclosure.

In addition to numerical data, categorical data, such as strings, may also be fed into the machine learning model. However, most machine learning algorithms typically only handle numerical values, such as data matrices. At operation 308, string data may be converted to numerical values. In some examples, one-hot encoding may be employed to convert categorical data (e.g., string data) to numerical data. FIG. 5 illustrates an example of one-hot encoding of converting string data. Here, the table 502 of select features including categorical data is converted to a matrix 504 of numerical values. For example, machine type (CVD-01, CVD-02) is encoded into columns 0 and 1 of matrix 504.

Returning to FIG. 3, at operation 310, the data may be scaled. For example, the numerical values in the matrix may be scaled or normalized so that the values are evaluated based on proportions, not the absolute value. Better performance of machine learning model can be obtained with scaled data so that features are evaluated by their proportions, but not by their absolute values (e.g., sizes). For example, upstream parametric data may include multiple values for different steps (e.g., thickness before polishing step); those numerical values may be scaled or normalized. Scaling (or normalizing) may ensure that numerical values of features are weighted properly and are represented by their percentage. In some examples, the lowest and highest value of a feature may be determined. Based on the lowest and highest value, the numerical values for that feature may be normalized so that they fall within 0 (the lowest value) and 1 (the highest value).

At operation 312, a set of variables known as hyperparameters of the RNN model may be tuned. Hyperparameters may be configured in the training mode, and their values are used to control the learning process and can significantly affect the model performance. The hyperparameters may include the number of hidden layers in the neural network, number of neurons at each layer, batch size, epoch, dropout, etc. Batch size refers to the size of records that are fed into the model at one time (e.g., 100 records at a time). Epoch refers to the number of times the same data is fed into the model. Dropout refers to the percentage of the data that is removed in each epoch. For example, if in a first epoch a 100 records were fed into the model using 10 batches of 10 records each and the dropout rate is 20%, then in the second epoch, 80 of the 100 records are fed back into the model in 8 batches of 10 records each. The 20 records that were removed between the first and second epochs may be selected using a random selection technique.

In some examples, at least a part of the hyperparameter tuning may be performed manually by practitioners, e.g., data scientists using heuristics. In some examples, the best value for a hyperparameter on a given problem may not be known, and therefore, the techniques may use rules of thumb, copy values used on other problems, and/or search for the best value by trial and error (e.g., iterative process). For example, when designing a RNN model for deposition rate for a CVD process, hyperparameters for a previous model designed for a similar process, such as physical vapor deposition (PVD), can be used. The PVD hyperparameters may be further tuned using the techniques described above. Hyperparameter tuning may also use automated techniques such as grid search to determine optimal values.

Figure 6:
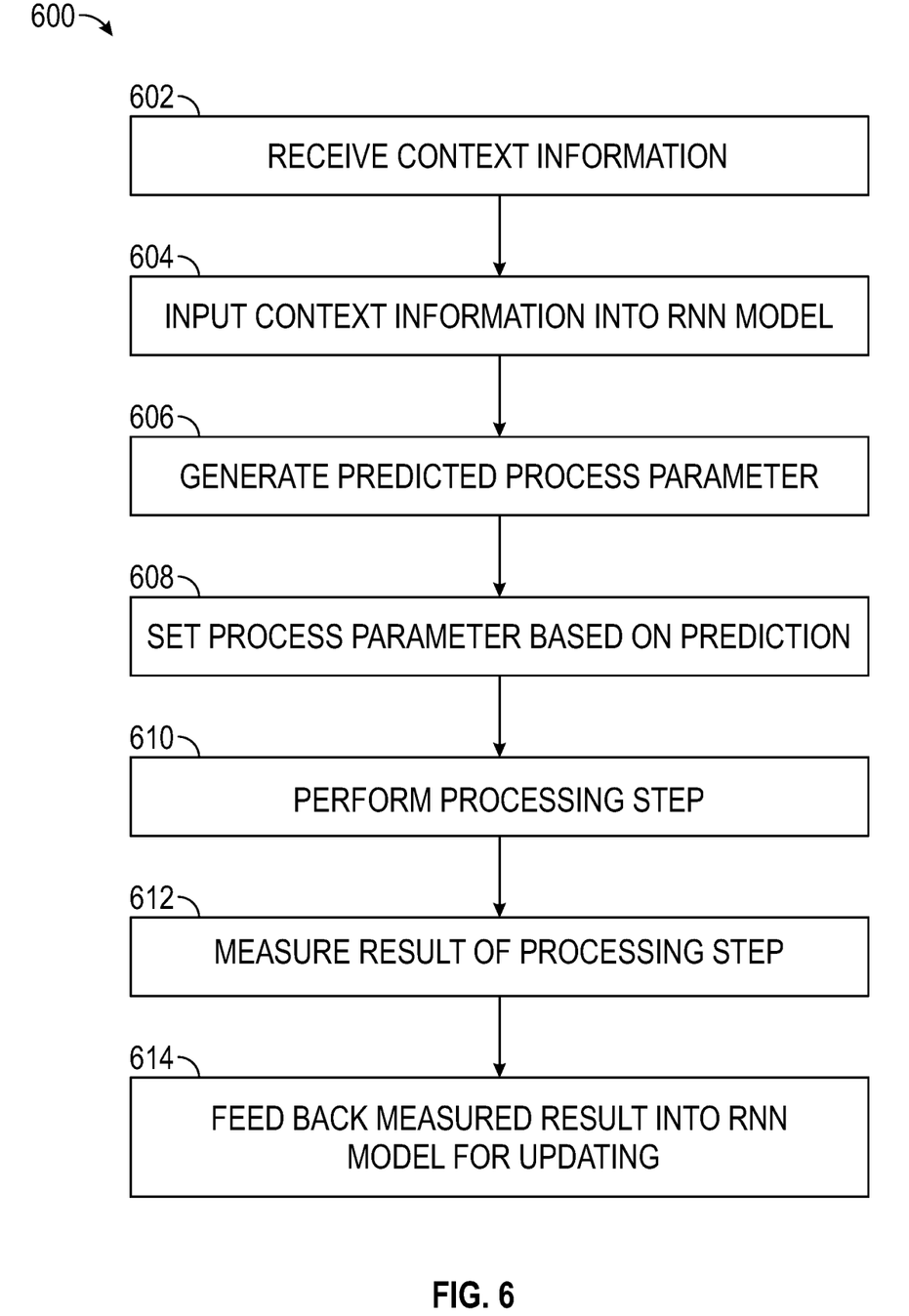
FIG. 6 illustrates a flow diagram of a method for manufacturing a semiconductor device in normal operation mode, according to some examples of the present disclosure.

After the machine learning network completes the training process, the RNN model can be used in normal operation (runtime) mode to set process parameters during manufacturing. FIG. 6 illustrates a flow diagram of a method 600 for manufacturing a semiconductor device in normal operation mode. In some examples, method 600 may be performed by fabrication system 100 with a trained RNN model (e.g., using framework 200 and method 300) as described herein.

At operation 602, manufacturing tool/machine may provide context information to a control system with respect to a processing step to be performed by the manufacturing tool/machine. In the deposition example, the manufacturing tool may provide information regarding tool identification, product identification, layer number, etc. At operation 604, the control system may input the received context information into the trained RNN model. At operation 606, the RNN model may generate a predicted process parameter (e.g., deposition rate prediction).

At operation 608, the control system may set the process parameter (e.g., deposition time) for the manufacturing tool based on predicted process parameter. At operation 610, the manufacturing tool may perform the processing step (e.g., deposition) using the set process parameter. At operation 612, a metrology instrument may measure the result of the processing step (e.g., film thickness). At operation 614, the measured result may then be fed back in to the RNN model to update the model. In some examples, the measured results values may be filtered and pre-processed, as described herein (e.g., method 500). For example, a filtering operation may be performed on the measured results to remove outlier values, which could be generated by a faulty run. In some examples, detection systems can be used to detect faulty runs and if a faulty run is detected, the results from the faulty run may be discarded and not fed back into the RNN model. For example, a fault detection and classification (FDC) system may be used to detect indicators of a faulty run. For example, the FDC system may monitor tool temperature, gas flow, etc., which can be indicators of a faulty run.

In some examples, the measured results may be fed back into the RNN in batches. The measured results from a set of product lots may be saved and then fed back into the RNN as a batch for updating the model. The batch size may be the same batch size, which was tuned in the hyperparameter tuning operation used for training the RNN model. In some examples, the measured results may be monitored, and if the quality of the predicted processed parameters starts deteriorating, then updating of the RNN model may be stopped. The RNN model may then be reset.

Figure 7:
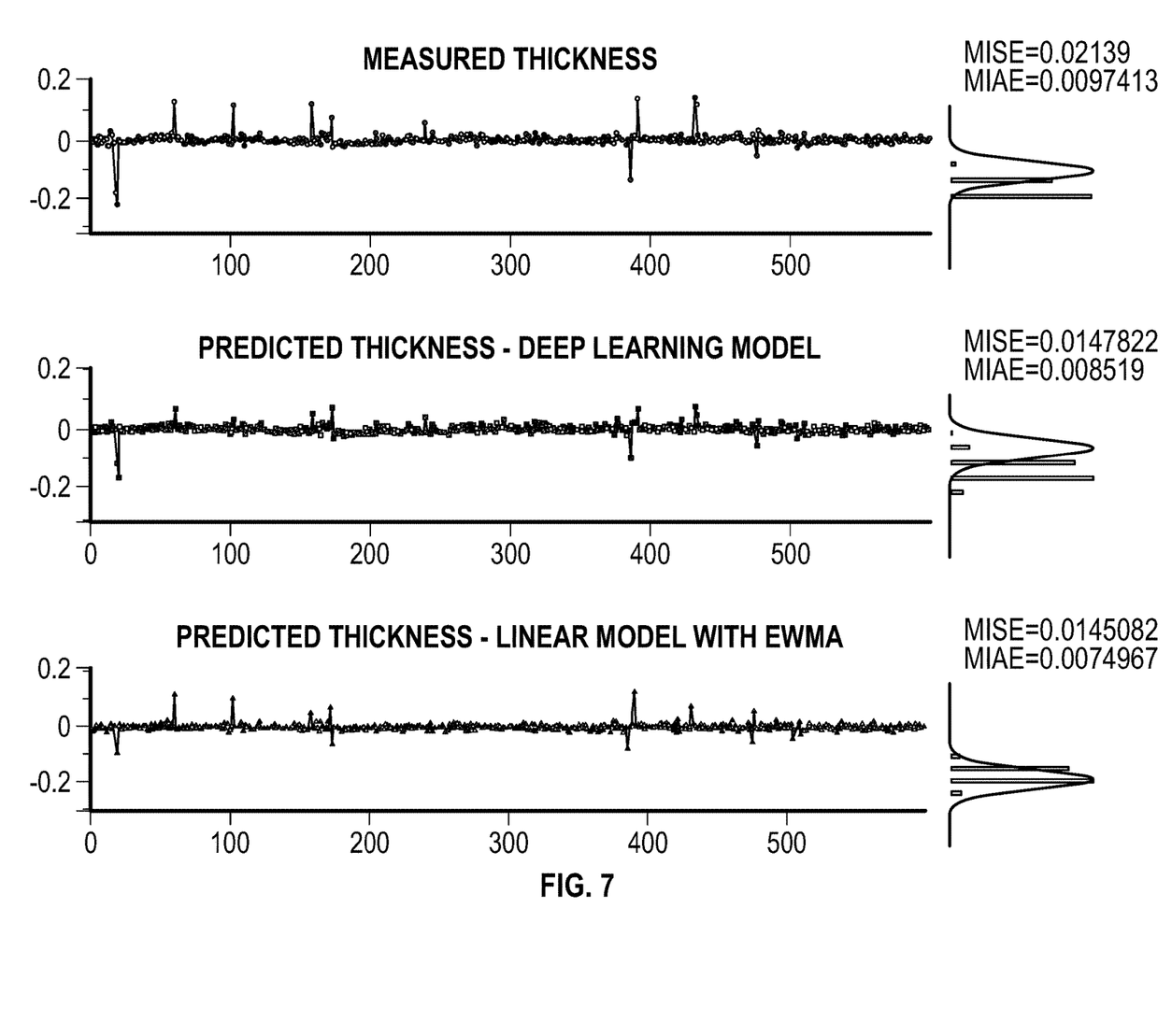
FIG. 7 shows simulation results of deposition controller, according to some examples of the present disclosure.

FIG. 7 shows simulation results of deposition controller with a RNN deep learning model vs. a traditional linear model with exponentially weighted moving average (EWMA) tuning algorithm. The simulation results with production data show the deposition controller powered by the RNN deep learning model performs comparable (31% Root Mean Squared Error (RMSE) reduction) compared to the traditional R2R strategy with linear model and EWMA tuning algorithm (32% RMSE reduction). Thus, machine learning solutions can provide complementary capability in complex, time sensitive situations where an accurate physical or statistical model is not ready yet, in addition to being used in a high-mix production environment.

Some examples of using the machine learning network above were described for predicting deposition rate for CVD process. To be clear, the techniques described herein using machine learning networks can be used for other semiconductor manufacturing processes such as, but not limited to, predicting etch rate for etch process, polish rate for CMP, offset adjustment for photolithography, plating rate for plating.

Figure 8:
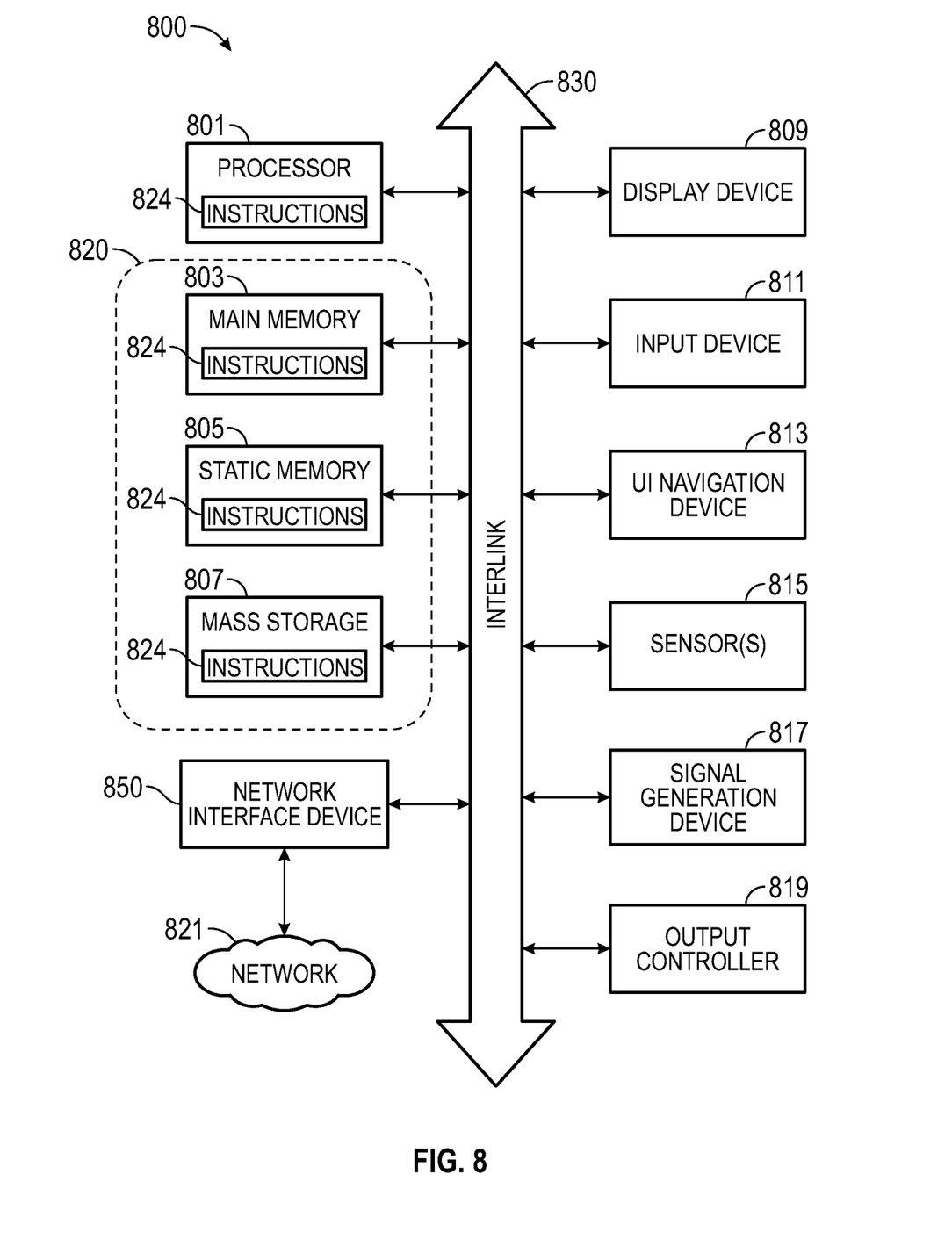
FIG. 8 illustrates a block diagram of an example comprising a machine upon which any one or more of the techniques (e.g., methodologies) discussed herein may be performed.

The techniques shown and described in this document can be performed using a portion or an entirety of a fabrication system 100 as shown in FIG. 1 or otherwise using a machine 800 as discussed below in relation to FIG. 8. FIG. 8 illustrates a block diagram of an example comprising a machine 800 upon which any one or more of the techniques (e.g., methodologies) discussed herein may be performed. In various examples, the machine 800 may operate as a standalone device or may be connected (e.g., networked) to other machines.

In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer-readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine 800 (e.g., computer system) may include a hardware-based processor 801 (e.g., a central processing unit (CPU), a graphics processing unit (GPU), a hardware processor core, or any combination thereof), a main memory 803 and a static memory 805, some or all of which may communicate with each other via an interlink 830 (e.g., a bus). The machine 800 may further include a display device 809, an input device 811 (e.g., an alphanumeric keyboard), and a user interface (UI) navigation device 813 (e.g., a mouse). In an example, the display device 809, the input device 811, and the UI navigation device 813 may comprise at least portions of a touch screen display. The machine 800 may additionally include a storage device 820 (e.g., a drive unit), a signal generation device 817 (e.g., a speaker), a network interface device 850, and one or more sensors 815, such as a global positioning system (GPS) sensor, compass, accelerometer, or other sensor. The machine 800 may include an output controller 819, such as a serial controller or interface (e.g., a universal serial bus (USB)), a parallel controller or interface, or other wired or wireless (e.g., infrared (IR) controllers or interfaces, near field communication (NFC), etc., coupled to communicate or control one or more peripheral devices (e.g., a printer, a card reader, etc.).

The storage device 820 may include a machine readable medium on which is stored one or more sets of data structures or instructions 824 (e.g., software or firmware) embodying or utilized by any one or more of the techniques or functions described herein. The instructions 824 may also reside, completely or at least partially, within a main memory 803, within a static memory 805, within a mass storage device 807, or within the hardware-based processor 801 during execution thereof by the machine 800. In an example, one or any combination of the hardware-based processor 801, the main memory 803, the static memory 805, or the storage device 820 may constitute machine readable media.

While the machine readable medium is considered as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 824 may further be transmitted or received over a communications network 821 using a transmission medium via the network interface device 850 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., the Institute of Electrical and Electronics Engineers (IEEE) 802.22 family of standards known as Wi-Fi®, the IEEE 802.26 family of standards known as WiMax®), the IEEE 802.27.4 family of standards, peer-to-peer (P2P) networks, among others. In an example, the network interface device 850 may include one or more physical jacks (e.g., Ethernet, coaxial, or phone jacks) or one or more antennas to connect to the communications network 821. In an example, the network interface device 850 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following aspects are hereby incorporated into the Detailed Description as examples or implementations, with each aspect standing on its own as a separate implementation, and it is contemplated that such implementations can be combined with each other in various combinations or permutations.

What is claimed is:

1. A method to set at least one processing parameter for manufacturing a semiconductor device, the method comprising:
    receiving context information regarding the at least one processing parameter for performing a processing step by a manufacturing machine to manufacture the semiconductor device;
    inputting the context information into a machine learning network;
    receiving a predicted value for the at least one processing parameter from the machine learning network;
    setting the at least one processing parameter for the manufacturing machine based on the predicted value to perform the processing step to manufacture the semiconductor device;
    receiving, from a metrology instrument, a measured result of the processing step on the semiconductor device associated with the at least one processing parameter; and
    feeding back the measured result into the machine learning network,
    wherein the machine learning network is trained based on a plurality of features identified by performing a regression technique to estimate a variance of the at least one processing parameter to identify the plurality of features as having a direct relationship to the variance,
    wherein the plurality of features includes at least one manufacturing context feature, at least one equipment hardware parameter feature, and at least one upstream parametric data feature.

2. The method of claim 1, wherein the machine learning network includes a recurrent neural network (RNN) deep learning model.

3. The method of claim 1, wherein the machine learning network is trained to generate the predicted value using a training process comprising:
    retrieving data associated with historical production;
    selecting a subset of the data based on a plurality of features relevant to the at least one processing parameter, wherein the plurality of features are independent; and
    inputting the subset in the machine learning network for training.

4. The method of claim 3, wherein the training process further comprises:
    filtering the subset of the data to remove outlier values.

5. The method of claim 3, wherein the training process further comprises:
    converting string data in the subset of the data to numerical values.

6. The method of claim 3, wherein the training process further comprises:
    scaling the subset of the data to generate normalized data.

7. The method of claim 3, wherein the training process further comprises:
    tuning at least one hyperparameter associated with the machine learning network.

8. A control system comprising:
    at least one hardware processor; and
    at least one memory storing instructions that, when executed by the at least one hardware processor, cause the at least one hardware processor to perform operations comprising:
        receiving context information regarding at least one processing parameter for performing a processing step by a manufacturing machine to manufacture a semiconductor device;

inputting the context information into a machine learning network;

receiving a predicted value for the at least one processing parameter from the machine learning network;

setting the at least one processing parameter for the manufacturing machine based on the predicted value to perform the processing step to manufacture the semiconductor device;

receiving, from a metrology instrument, a measured result of the processing step on the semiconductor device associated with the at least one processing parameter; and feeding back the measured result into the machine learning network, wherein the machine learning network is trained based on a plurality of features identified by performing a regression technique to estimate a variance of the at least one processing parameter to identify the plurality of features as having a direct relationship to the variance, wherein the plurality of features includes at least one manufacturing context feature, at least one equipment hardware parameter feature, and at least one upstream parametric data feature.

9. The control system of claim 8, wherein the machine learning network includes a recurrent neural network (RNN) deep learning model.

10. The control system of claim 8, wherein the machine learning network is trained to generate the predicted value using a training process comprising:

retrieving data associated with historical production;

selecting a subset of the data based on a plurality of features relevant to the at least one processing parameter, wherein the plurality of features are independent; and inputting the subset in the machine learning network for training.

11. The control system of claim 10, wherein the training process further comprises:

filtering the subset of the data to remove outlier values.

12. The control system of claim 10, wherein the training process further comprises:

converting string data in the subset of the data to numerical values.

13. The control system of claim 10, wherein the training process further comprises:

scaling the subset of the data to generate normalized data.

14. The control system of claim 10, wherein the training process further comprises:

tuning at least one hyperparameter associated with the machine learning network.

15. A machine-storage medium embodying instructions that, when executed by a machine, cause the machine to perform operations comprising:

receiving context information regarding at least one processing parameter for performing a processing step by a manufacturing machine to manufacture a semiconductor device;

inputting the context information into a machine learning network;

receiving a predicted value for the at least one processing parameter from the machine learning network;

setting the at least one processing parameter for the manufacturing machine based on the predicted value to perform the processing step to manufacture the semiconductor device;

receiving, from a metrology instrument, a measured result of the processing step on the semiconductor device associated with the at least one processing parameter; and feeding back the measured result into the machine learning network, wherein the machine learning network is trained based on a plurality of features identified by performing a regression technique to estimate a variance of the at least one processing parameter to identify the plurality of features as having a direct relationship to the variance, wherein the plurality of features includes at least one manufacturing context feature, at least one equipment hardware parameter feature, and at least one upstream parametric data feature.

16. The machine-storage medium of claim 15, wherein the machine learning network includes a recurrent neural network (RNN) deep learning model.

17. The machine-storage medium of claim 15, wherein the machine learning network is trained to generate the predicted value using a training process comprising:

retrieving data associated with historical production;

selecting a subset of the data based on a plurality of features relevant to the at least one processing parameter, wherein the plurality of features are independent; and inputting the subset in the machine learning network for training.

18. The machine-storage medium of claim 17, wherein the training process further comprises:

filtering the subset of the data to remove outlier values.

19. The machine-storage medium of claim 17, wherein the training process further comprises:

converting string data in the subset of the data to numerical values.

20. The machine-storage medium of claim 17, wherein the training process further comprises:

scaling the subset of the data to generate normalized data.

* * * * *